US011936147B2

(12) United States Patent
Muznik et al.

(10) Patent No.: US 11,936,147 B2
(45) Date of Patent: Mar. 19, 2024

(54) ELECTRICAL CONNECTION

(71) Applicant: Hidria d.o.o., Tolmin (SI)

(72) Inventors: Tadej Muznik, Most na Soci (SI); Bojan Meklav, Most na Soci (SI); Vasja Tuta, Tolmin (SI)

(73) Assignee: Hidria d.o.o. (SI)

( * ) Notice: Subject to any disclaimer, the term of this patent is extended or adjusted under 35 U.S.C. 154(b) by 0 days.

(21) Appl. No.: 17/789,941

(22) PCT Filed: Nov. 24, 2020

(86) PCT No.: PCT/EP2020/083156
§ 371 (c)(1),
(2) Date: Jun. 29, 2022

(87) PCT Pub. No.: WO2021/144055
PCT Pub. Date: Jul. 22, 2021

(65) Prior Publication Data

US 2023/0054762 A1 Feb. 23, 2023

(30) Foreign Application Priority Data

Jan. 14, 2020 (EP) .................................... 20151713

(51) Int. Cl.
*H01R 39/36* (2006.01)
*H01R 39/02* (2006.01)

(52) U.S. Cl.
CPC ........... *H01R 39/36* (2013.01); *H01R 39/027* (2013.01)

(58) Field of Classification Search
CPC .... H01R 39/36; H01R 39/027; H01R 39/025; F01N 2240/04; F01N 13/185;
(Continued)

(56) References Cited

U.S. PATENT DOCUMENTS 6,025,578 A 2/2000 Emissionstechnologie
6,031,213 A 2/2000 Hashimoto et al.
(Continued)

FOREIGN PATENT DOCUMENTS

DE 102016209282 A1 11/2017
EP 716558 A3 8/1996
(Continued)

OTHER PUBLICATIONS

"Mohs Hardness Scale," Roseville Rock Rollers, accessed at https://web.archive.org/web/20110415092249/http://www.rockrollers.com/features/hardness.html (Year: 2015).*
(Continued)

*Primary Examiner* — Tulsidas C Patel
*Assistant Examiner* — Joshua Kiel M Rodriguez
(74) *Attorney, Agent, or Firm* — Lucian Wayne Beavers; Patterson Intellectual Property Law, PC

(57) ABSTRACT

The invention refers to an electrical connection (10) comprising a bushing (12) having a geometric central axis (14), an electrical conductor (16) passing through said bushing (12) along the geometric central axis (14), and an insulating layer (18) electrically insulating said bushing (18) from said conductor (16). It is suggested that the bushing 12, the insulating layer (18) and the electric conductor (16) are pressed together, preferably during a rotary forging process, in order to achieve a mechanical cold transformation.

15 Claims, 8 Drawing Sheets

Figure 1:
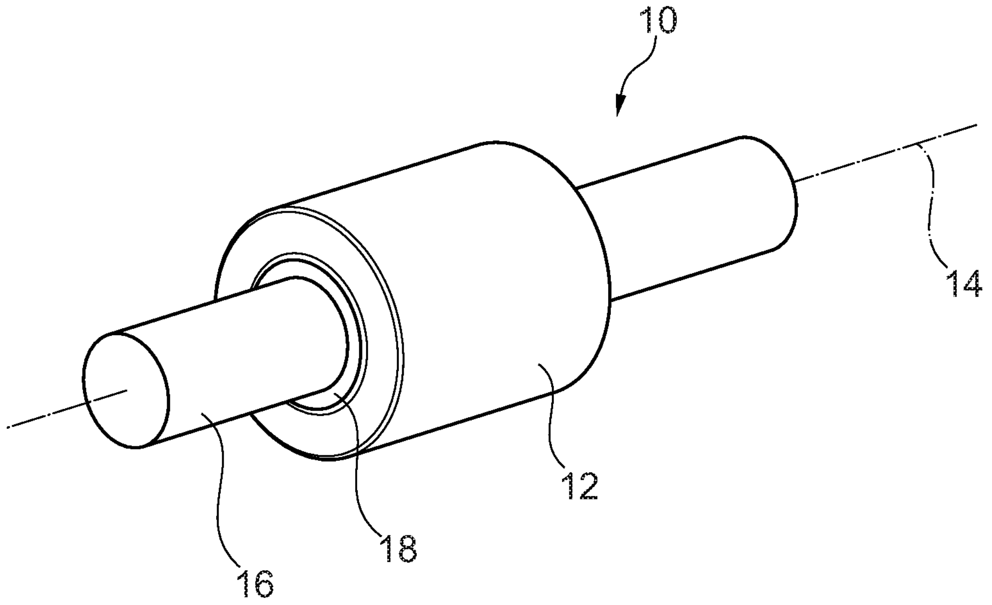

(58) Field of Classification Search
CPC .. F01N 13/18; F01N 13/1838; F01N 13/1844; F01N 13/00; H01B 7/40; H01B 17/308; H01B 17/30; H01B 17/303
See application file for complete search history.

(56) References Cited

U.S. PATENT DOCUMENTS

| | | | | |
|---|---|---|---|---|
| 6,641,444 | B2 * | 11/2003 | Hanazaki | H01R 11/11 439/877 |
| 7,290,334 | B2 | 11/2007 | Pettersen | |
| 7,875,803 | B2 | 1/2011 | SJberg et al. | |
| 9,225,107 | B2 | 12/2015 | Hirth et al. | |
| 10,941,688 | B2 | 3/2021 | Hirth et al. | |
| 2015/0011115 | A1 * | 1/2015 | Hirth | H01R 4/302 439/475 |
| 2015/0139851 | A1 * | 5/2015 | Nakamura | C21D 6/002 420/38 |
| 2016/0365173 | A1 * | 12/2016 | Kang | B32B 5/022 |

FOREIGN PATENT DOCUMENTS

| | | | | | |
|---|---|---|---|---|---|
| EP | 902991 | B1 | | 9/2000 | |
| EP | 2828932 | B1 | | 5/2017 | |
| JP | 4341235 | B2 | * | 10/2009 | F16C 17/02 |
| JP | 5812226 | B1 | * | 11/2015 | H01B 17/30 |
| WO | 2006049567 | A1 | | 5/2006 | |
| WO | 2006057592 | A1 | | 6/2006 | |
| WO | 2019053250 | A1 | | 3/2019 | |

OTHER PUBLICATIONS

English translation of JP-5812226-B1 (Year: 2015).*

International Search Report for corresponding PCT/EP2020/083156, dated Dec. 10, 2020, 11 pages (not prior art).

European Search Report for corresponding patent application No. 20151713.3, dated May 4, 2020, 7 pages (not prior art).

* cited by examiner

Detail A:

Detail B:

Detail C:

Detail D:

ELECTRICAL CONNECTION

The present invention refers to an electrical connection comprising

- a bushing having a geometric central axis,
- an electrical conductor passing through said bushing along the geometric central axis, and
- an insulating layer electrically insulating said bushing from said conductor.

The electrical connection (or electrical connector arrangement) may be installed in a jacket or casing of an exhaust-gas system of an internal combustion engine and electrically connected to an electrical component to be disposed in the jacket. The electrical component is preferably an electrically heatable grid or honeycomb body of a catalytic converter which is intended to be supplied with electric current through the electrical conductor after installation of the electrical component. The electrical connection is inserted into a mounting flange or an opening of the jacket and the bushing is fixed in the opening, e.g. by welding to the jacket. An end of the electrical conductor opposite to the electrical component may be connected to an electrical cable. An end of the cable opposite to the electrical connection may be connected to an electric power source, for example a battery or a control unit of a motor vehicle.

Electrical connections of the above-mentioned kind are well-known in the art. For example, EP 2 828 932 B1 describes an electrical connection which can draw currents of 30 amperes or more, up to several hundred amperes. The insulating layer is formed of compressed ceramic powder and is virtually incompressible. An outer cross section of the electrical connection has a non-circular form, e.g. a polygonal cross section, in order to avoid rotation of the electrical connection in the jacket or the like even in case of very high torques.

U.S. Pat. No. 6,025,578 describes an electrical connection having a sacrificial electrode, a protective layer or other kinds of protective configurations in contact with the bushing outside of the jacket or the like to which the bushing is welded. The bushing is made of metal and the insulating layer is made of aluminium oxide. The sacrificial electrode is a zinc block. This makes the sacrificial electrode corrode in case an electrolyte, e.g. salt water, accumulates above the bushing and prevents corrosion of the bushing or the electrical conductor.

EP 0 902 991 B1 describes an electrical connection of the above-mentioned kind. Different types of connections between an end of the electrical conductor opposite to the electrical component (e.g. an electrically heatable grid or honeycomb body of a catalytic converter) and an electrical cable are suggested. Thus, a reliable electric connection can be achieved in a fast and easy manner.

The known electrical connections have a number of drawbacks:

- An insulating layer made of ceramic material has the disadvantage that when the bushing is welded to a jacket or casing the insulating layer may crack due to the different thermal shrinkage values of the material of the bushing and the ceramic material of the insulating layer, thereby affecting good insulation characteristics and air-tightness of the electrical connections.
- During use of the electrical connections the temperature may vary between ambient temperature (as far down as −40° C.) when the combustion engine and the catalytic converter have been turned off and cooled down, and around+1,000° C. when the combustion engine and the catalytic converter are in operation. This may negatively affect the physical, mechanical, electrical and thermal characteristics and properties of the electrical connection.

- The known electrical connections are able to cope only with a very limited amount of force and torque. The main problem is not that the entire electrical connection loosens and falls out of the mounting flange or opening of the jacket or casing into which it is welded. Rather, the mechanical interconnection between the electric conductor and the insulating layer and/or between the insulating layer and the bushing may loosen and break up due to large force and/or torque values acting on the electrical connection. For example, the electrical connection known from U.S. Pat. No. 9,225,107 B2 can absorb torques of only up to 8 Nm. This amount should be increased.
- The sealing effect of the insulating layer is not satisfactory. There may be a leakage of gas or fluid (e.g. exhaust gas) from the inside of the jacket or casing to the environment across the electrical connection welded into the mounting flange or opening of the jacket or casing. The gas or fluid may be chemically aggressive leading to corrosion of the bushing and/or the electrical conductor. For this reason, U.S. Pat. No. 6,025,578 suggests some kind of protective configuration for preventing corrosion.

Therefore, it is an object of the present invention to provide for an electrical connection which overcomes at least some of the above-mentioned drawbacks. In particular, it is an object to provide for an electrical connection with the following properties:

- the electrical connection should be able to cope with a minimum voltage of up to 52 V DC-voltage without damage, preferably up to 100 V DC,
- the electrical connection should be able to cope with a minimum electric current value of 150 A without damage, preferably of up to 200 A,
- the electrical connection should have a temperature stability and/or an amount of mechanical flexibility in order to compensate for the large temperature changes of more than 1,000° K without damage,
- the electrical connection should provide for an airtight sealing of the jacket or casing to which it is attached (e.g. welded or screwed), with a maximum leakage of less than 30 ml/min at 0.3 bar pressure in the jacket or casing, preferably less than 25 ml/min,
- the electrical connection should provide for a good electric insulation of the electrical conductor in respect to the bushing and the jacket or casing, in particular the electrical connection should provide for an insulation resistance of more than 10 MΩ (preferably a couple of GΩ) under ambient environmental conditions (e.g. temperature 22° C.+/−2° C., pressure around 1,000 hPa and relative humidity 35%-70%) and at 500 V DC-voltage,
- the electrical connection should have a breaking torque above 15 Nm, preferably above 16 Nm, particularly preferred above 17 Nm, in particular around 20 Nm.

This object is solved by an electrical connection comprising the features of claim 1. In particular, starting from the electrical connection of the above-identified kind, it is suggested that the bushing, the insulating layer and the electric conductor are pressed together in order to achieve a mechanical cold transformation. The bushing, the insulating layer and the electric conductor are arranged coaxially in respect to the geometric central axis of the bushing and then pressed together in order to achieve the mechanical cold transformation. The bushing, the insulating layer and the electric conductor are preferably pressed together during a rotary forging process. The pressure acts on the external circumferential surface of the bushing of the electrical connection. The pressure is preferably directed in a radial direction inwards towards the geometric central axis.

Due to the mechanical cold transformation the interconnection between the bushing and the insulating layer and between the insulating layer and the electric conductor is significantly increased. The electrical connection can absorb much higher force and torque values without damage. In particular, the mechanical interconnection between the electric conductor and the insulating layer and/or between the insulating layer and the bushing does not loosen and break up, even if high force and torque values are applied to the electrical connection.

The bushing, the insulating layer and the electrical conductor are preferably rotationally symmetric in respect to the geometric central axis. In particular, in a cross sectional view the bushing, the insulating layer and the electrical conductor all have a circular or a circular ring form.

The electrical conductor is dimensioned such that it can withstand a minimum voltage of 52 V DC and a current of up to 200 A. To this end, it is suggested that the diameter of the conductor is between 5.0 mm and 8.0 mm, preferably between 6.0 mm and 7.5 mm. The external diameter of the bushing of the electrical connection is dictated by the dimensions of a mounting flange or opening, into which the bushing is fixed, and/or the intended use of the electrical connection. In particular, the bushing should neatly fit into the opening in the jacket or casing. Typical examples for the external diameter of the bushing are between 12.0 mm and 18.0 mm, preferably around 14.0 mm. In a cross section, the bushing preferably has a thickness between the internal circumferential surface and the external circumferential surface of between 1.0 mm to 5.0 mm, preferably of about 2.0 mm. The thickness of the insulating layer depends of the given diameters of the electrical conductor and of the bushing, as well as of the electrical properties to be achieved by the electrical connection. For example, the insulating layer should achieve an insulation resistance of more than 10 MΩ (preferably up to a couple of GΩ) under ambient environmental conditions (e.g. temperature 22° C.+/−2° C., pressure around 1,000 hPa and relative humidity 35%-70%) and at 500 V DC-voltage. In order to achieve these insulating characteristics, depending on the material used for the insulating layer, it has a thickness of at least 1.2 mm, preferably around 1.6 mm.

According to a preferred embodiment of the present invention, it is suggested that the electrical conductor has an external circumferential surface with at least one of an arithmetic average roughness of at least Ra=1 μm (or higher), protrusions and recesses on at least part of an external circumferential surface of the electrical conductor, which is covered by the insulating layer. The roughness of the external circumferential surface may be Ra>2 μm, preferably Ra>3 μm, particularly preferred Ra>4 μm, Ra>5 μm or even Ra>10 μm. The roughness is such that it provides protrusions (i.e. positive peaks) and/or recesses (i.e. negative peaks or troughs) in an irregular distribution in respect to a mean surface extension. The desired roughness may be achieved during manufacturing, i.e. by machine turning, of the electrical conductor, e.g. by reducing the rotational speed with which the external circumferential surface is machined, e.g. by means of a cutting or milling tool. In particular, if the rotational speed, with which the external circumferential surface is machined is reduced, the roughness of the circumferential surface may increase. Alternatively, a desired roughness value could also be achieved by an additional process step after the manufacturing of the electrical conductor.

During the mechanical cold transformation pressure acts in a radial direction onto the external circumferential surface of the bushing. The bushing transfers at least part of the radial pressure onto the insulating layer which is pressed onto the external circumferential surface of the electrical conductor. Some of the insulating material is pressed into the recesses provided on the external circumferential surface of the electrical conductor and/or the protrusions provided on the external circumferential surface of the electrical conductor are pressed into the insulating material. Thus, an interlocking connection is established between the electrical conductor and the insulating layer. This can further increase the force and torque values which the electrical connection can absorb without damage. In particular, the mechanical interconnection between the electric conductor and the insulating layer does not loosen and break up, even if high force and torque values are applied to the electrical connection.

Preferably, the protrusions have a cross section with a base on the external circumferential surface of the electrical conductor and side walls extending from the ends of the base and converging towards the top of the protrusion. Similarly, the grooves may have a cross section with an opening on the external circumferential surface and side walls extending from the ends of the opening and converging towards the bottom of the groove. A preferred cross section for the grooves is a U-shape, so the material of the insulating layer may enter and spread in the groove more easily. Of course, the grooves could also have any other cross section, e.g. a V-shaped cross section or a combination of a U- and a V-shape. A preferred cross section for the protrusions is a V-shape, so the protrusions enter more easily into the material of the insulating layer. Of course, the protrusions could also have any other cross section, e.g. a U-shaped cross section or a combination of a V- and a U-shape. A preferred depth of the recesses and a preferred height of the protrusions, respectively, may be between 0.05 mm and 0.3 mm, preferably about 0.15 mm, in respect to the rest of the external circumferential surface of the electrical conductor.

Further, it is suggested that the protrusions and/or the recesses provided on the external circumferential surface of the electrical conductor have a circumferential longitudinal extension and/or an axial longitudinal extension. For example, the protrusions or the recesses may have a longitudinal extension running in an essentially circumferential direction, i.e. around the geometric central axis of the bushing. Alternatively, the protrusions or the recesses may have a longitudinal extension running in an essentially axial direction, i.e. parallel to the geometric central axis of the bushing. Further, it is possible that the protrusions and/or the grooves have a longitudinal extension running in a circumferential as well as an axial direction. In that case, the protrusions and/or the grooves extend in a slanted or helical (i.e. spiral) manner on the external circumferential surface of the electrical conductor. Such protrusions and/or grooves may be achieved during manufacturing of the electrical conductor, e.g. by a certain feeding speed in respect to a rotational speed and a certain cutting depth of a cutting or milling tool with which the external circumferential surface is machined. Alternatively, the protrusions and/or grooves could also be achieved by an additional process step after the manufacturing of the electrical conductor. Of course, it is also possible that a first group of protrusions and/or grooves has a longitudinal extension in a first direction and a second group of protrusions and/or grooves has a longitudinal extension in a second direction and that the protrusions and/or the grooves of the first group intersect with the protrusions and/or the grooves of the second group.

It is preferred that the protrusions or recesses are part of a ribbed external circumferential surface of the electrical conductor. The ribbed surface preferably comprises a plurality of grooves. The grooves of a first group of grooves extend parallel to each other, preferably equidistant, and the grooves of a second group of grooves extend parallel to each other, preferably equidistant. The grooves of the first group of grooves run in an angle in respect to the grooves of the second group, the angle being larger than 0° and smaller than 180°. Preferably the angle between the first and second grooves is 90° resulting in a ribbed surface with rectangles or squares between the grooves. Alternatively, the angle may be between 10° and 80° resulting in a ribbed surface with rhombi between the grooves. Of course, instead of or additionally to the grooves, the ribbed surface could also comprise protrusions.

In order to facilitate the material of the insulating layer entering and spreading in the grooves and/or the protrusions entering into the material of the insulating layer, it is suggested that the insulating layer is made of a material having a lower hardness than the material of which the electrical conductor is made. In particular, it is preferred that the material of the insulating layer has a hardness lower than 5.5 on the Mohs scale, preferably a lower hardness than magnesium oxide (MgO). Preferably, the material of the insulating layer has a hardness on the Mohs scale of approximately 1.5 to 4.0, in particular of 2.0 to 3.0. For comparison, gold has a hardness on the Mohs scale of appr. 2.5 to 3.0, a copper coin of appr. 3.0 and steel of appr. 6.0 to 6.5. The material of the electrical conductor has a larger hardness than the insulating material.

According to another preferred embodiment of the invention, it is suggested that the bushing has an internal circumferential surface with at least one of an arithmetic average roughness of at least Ra=1 μm (or higher), protrusions and recesses on at least part of an internal circumferential surface of the bushing, which covers the insulating layer. Hence, the bushing has the form of a hollow cylinder and the internal circumferential surface of the bushing, where the insulating layer is located, comprises the desired roughness, protrusions and/or recesses. The roughness of the internal circumferential surface may be Ra>2 μm, preferably Ra>3 μm, particularly preferred Ra>4 μm, Ra>5 μm or even Ra>10 μm. The roughness is such that it provides protrusions (i.e. positive peaks) and/or recesses (i.e. negative peaks or troughs) in an irregular distribution in respect to a mean surface extension. The desired roughness may be achieved during manufacturing, i.e. by machine turning, of the bushing, e.g. by reducing the rotational speed with which the internal circumferential surface is machined, e.g. by means of a cutting or milling tool. In particular, if the rotational speed, with which the internal circumferential surface is machined is reduced, the roughness of the circumferential surface may increase. Alternatively, a desired roughness value could also be achieved by an additional process step after the manufacturing of the bushing.

During the mechanical cold transformation pressure acts in a radial direction onto the external circumferential surface of the bushing. The internal circumferential surface of the bushing is pressed in a radial direction onto the insulating layer. Some of the insulating material is pressed into the recesses provided on the internal circumferential surface of the bushing and/or the protrusions provided on the internal circumferential surface of the bushing are pressed into the insulating material. Thus, an interlocking connection is established between the bushing and the insulating layer. This can further increase the force and torque values which the electrical connection can absorb without damage. In particular, the mechanical interconnection between the bushing and the insulating layer does not loosen and break up, even if high force and torque values are applied to the electrical connection.

Preferably, the protrusions have a cross section with a base on the internal circumferential surface of the bushing and side walls extending from the ends of the base and converging towards the top of the protrusion. Similarly, the grooves may have a cross section with an opening on the internal circumferential surface and side walls extending from the ends of the opening and converging towards the bottom of the groove. A preferred cross section for the grooves is a U-shape, so the material of the insulating layer may enter and spread in the groove more easily. Of course, the grooves could also have any other cross section, e.g. a V-shaped cross section or a combination of a U- and a V-shape. A preferred cross section for the protrusions is a V-shape, so the protrusions enter more easily into the material of the insulating layer. Of course, the protrusions could also have any other cross section, e.g. a U-shaped cross section or a combination of a V- and a U-shape. A preferred depth of the recesses and a preferred height of the protrusions, respectively, may be between 0.05 mm and 0.3 mm, preferably about 0.15 mm, in respect to the rest of the internal circumferential surface of the bushing.

Further, it is suggested that the protrusions and/or the recesses provided on the internal circumferential surface of the bushing have at least one of a circumferential extension and an axial extension. For example, the protrusions or the recesses may have a longitudinal extension running in an essentially circumferential direction, i.e. around the geometric central axis of the bushing. Alternatively, the protrusions or the recesses may have a longitudinal extension running in an essentially axial direction, i.e. parallel to the geometric central axis of the bushing. Further, it is possible that the protrusions and/or the grooves have a longitudinal extension running in a circumferential as well as an axial direction. Hence, the protrusions and/or the grooves extend in a slanted or helical (i.e. spiral) manner on the internal circumferential surface of the bushing. Such protrusions and/or grooves may be achieved during manufacturing of the bushing, e.g. by a certain feeding speed in respect to a rotational speed and a certain cutting depth of a cutting or milling tool with which the internal circumferential surface is machined. Alternatively, the protrusions and/or grooves could also be achieved by an additional process step after the manufacturing of the bushing. Of course, it is also possible that a first group of protrusions and/or grooves has a longitudinal extension in a first direction and a second group of protrusions and/or grooves has a longitudinal extension in a second direction and that the protrusions and/or the grooves of the first group intersect with the protrusions and/or the grooves of the second group.

According to a preferred embodiment, the bushing has recesses in the form of axial grooves provided on the internal circumferential surface of the bushing and spaced apart from each other in a circumferential direction. The grooves have a longitudinal extension extending in an axial direction, i.e. parallel to the geometric central axis of the bushing. Preferably, the grooves are equally spaced apart from each other in the circumferential direction, i.e. each separated from neighbouring grooves by a given angle. If the angle is 120°, there are three grooves equally spaced to each other on the internal circumferential surface of the bushing. Of course, a different number of grooves and different angles between the grooves, equally spaced apart from each other or not, could be provided, too.

Preferably, the axial grooves do not extend along the entire axial extension of the internal circumferential surface of the bushing. Rather, it is suggested that the grooves extend only along a part of the internal surface of the bushing, starting at one end surface of the bushing and ending in a distance to an opposite end surface of the bushing. Hence, the grooves do not reach the opposite end surface of the bushing. This can further increase the force and torque values which the electrical connection can absorb without damage. In particular, an electrode displacement force acting on the electrical conductor in a direction towards the opposite end surface of the bushing will prevent the electrical conductor to be pressed or pulled out of the bushing together with the insulating layer. The electrode displacement force is preferably above 5,000 N, in particular between 5,500 N and 10,000 N.

In order to facilitate the material of the insulating layer entering and spreading in the grooves and/or the protrusions entering into the material of the insulating layer, it is suggested that the insulating layer is made of a material having a lower hardness than the material of which the bushing is made. Preferably, the material of the insulating layer has a hardness on the Mohs scale of approximately 1.5 to 4.0, in particular of 2.0 to 3.0. The material of the bushing has a larger hardness than the insulating material.

According to a preferred embodiment of the invention, it is suggested that the bushing and/or the electrical conductor is made of a stainless steel, in particular of a nickel-chromium-iron alloy. In principle, the bushing and/or the electrical conductor could be made of any suitable material provided that it has the necessary physical, mechanical, electrical and thermal properties of the bushing and/or the electrical conductor required for the electrical connection.

According to another preferred embodiment of the invention, it is suggested that the insulating layer is made of a material comprising at least 50% of a phyllosilicate mineral. Preferably, the insulating material comprises more than 70%, in particular around 90% of a phyllosilicate mineral. The rest of the material may be a laminate or bonding material. Preferably, the material of the insulting layer is less hygroscopic than magnesium oxide (MgO). In principle any material may be used for the insulating layer provided that it has the necessary physical, mechanical, electrical and thermal properties of the insulating material required for the electrical connection. In particular, the material should be elastic enough to compensate for the thermal expansion of the different materials used in the electrical connection due to the large range of thermal variation during the intended use of the electrical connection, without breaking or cracking. Hence, a high degree and long lasting air tightness of the electrical connection can be guaranteed.

Figure 2:
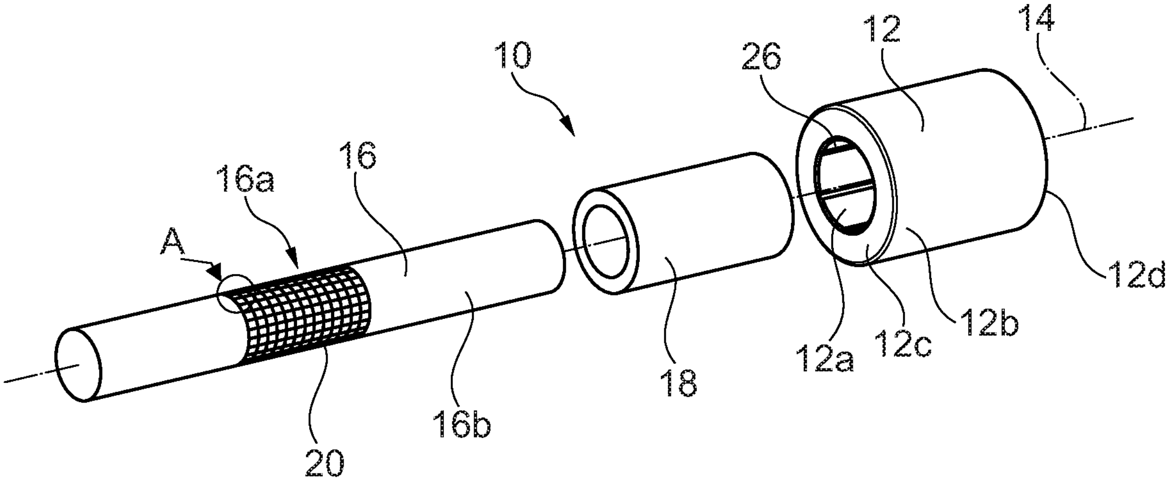
Figure 3:
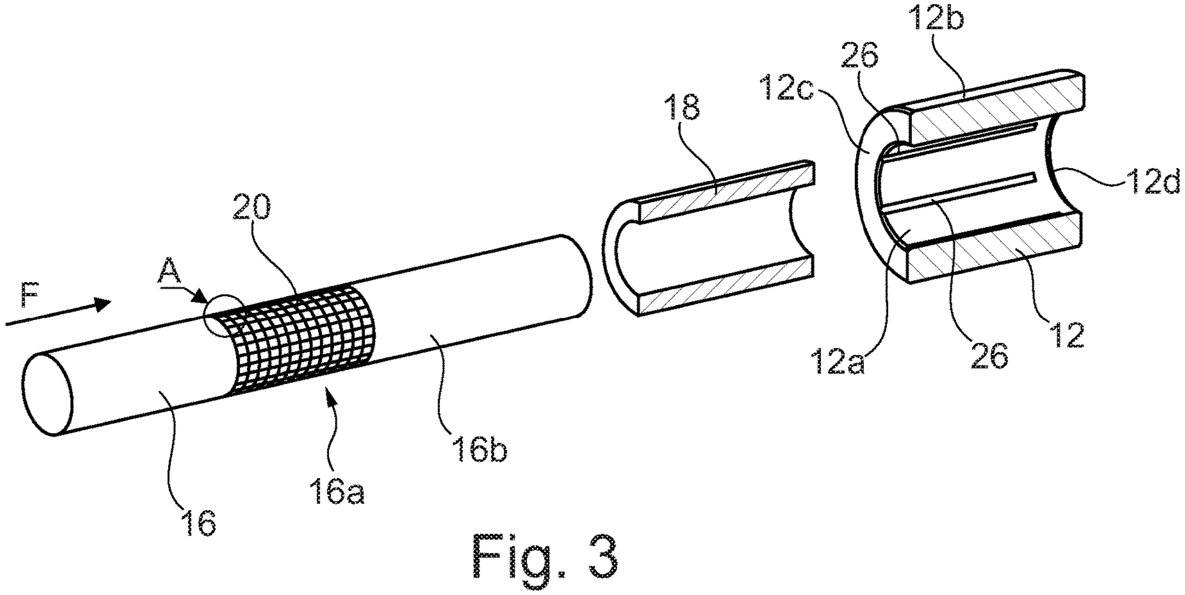
Figure 4:
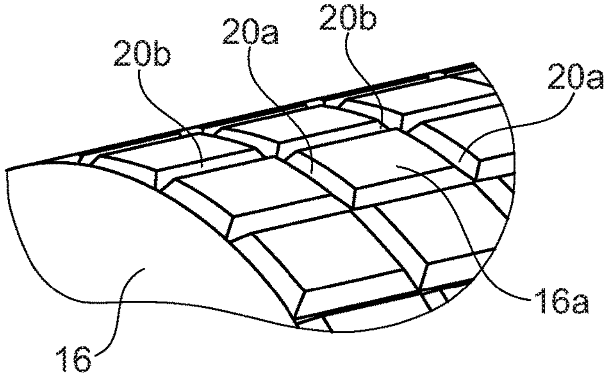
Figure 5:
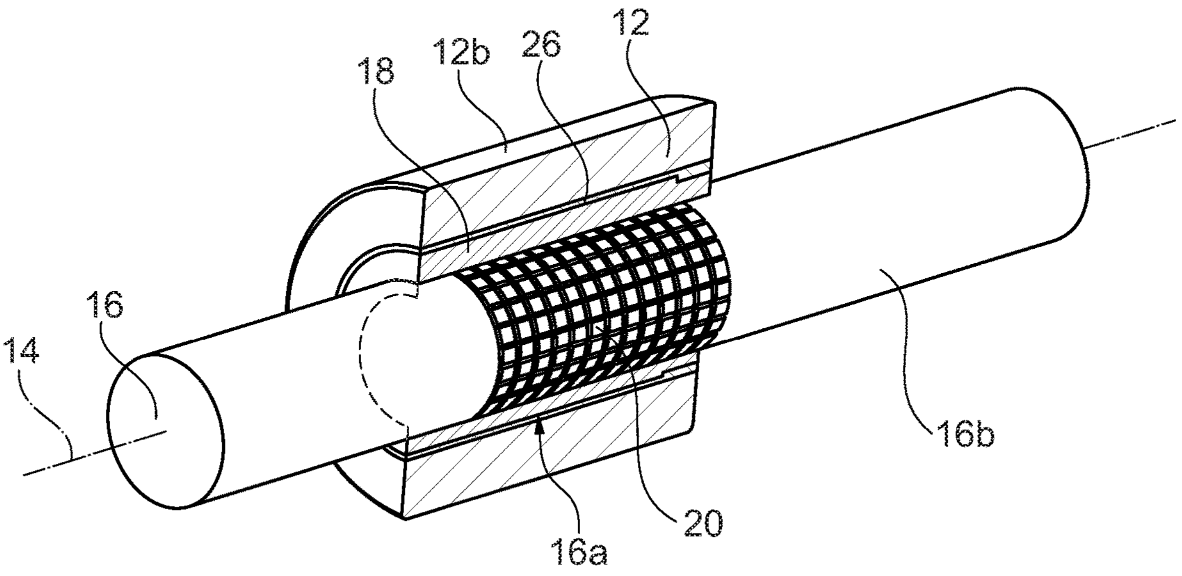
Figure 8:
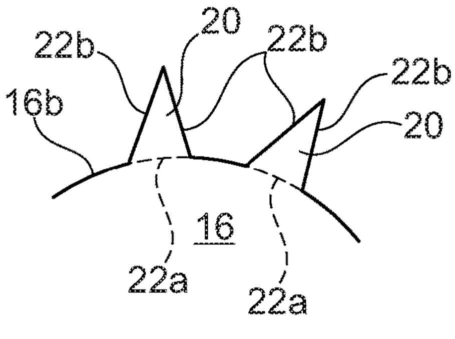
Figure 9:
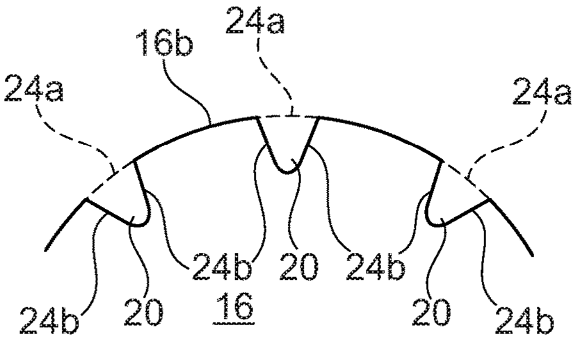
Figure 6:
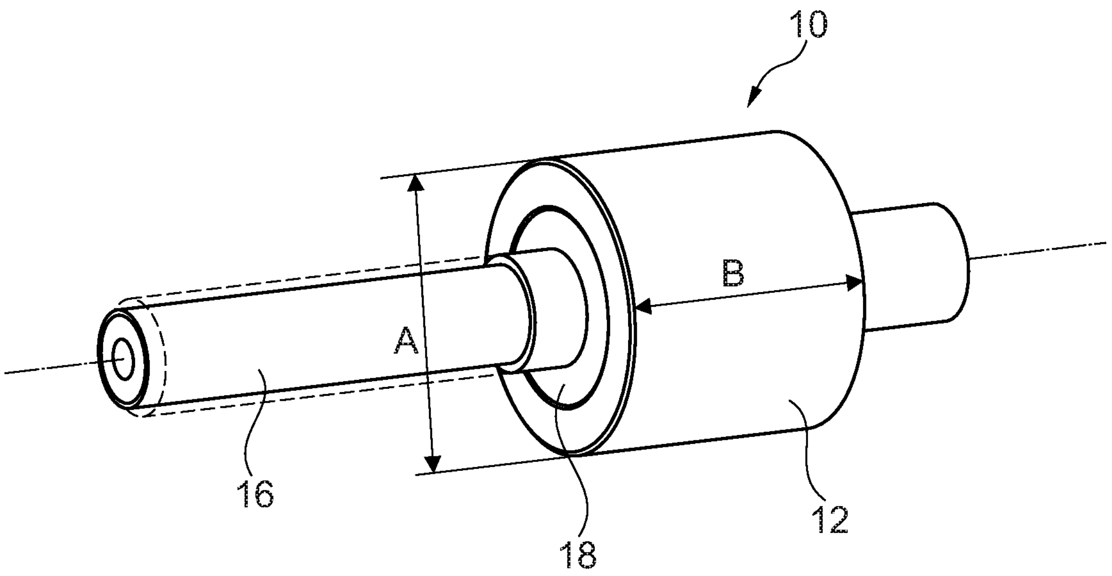
Figure 7:
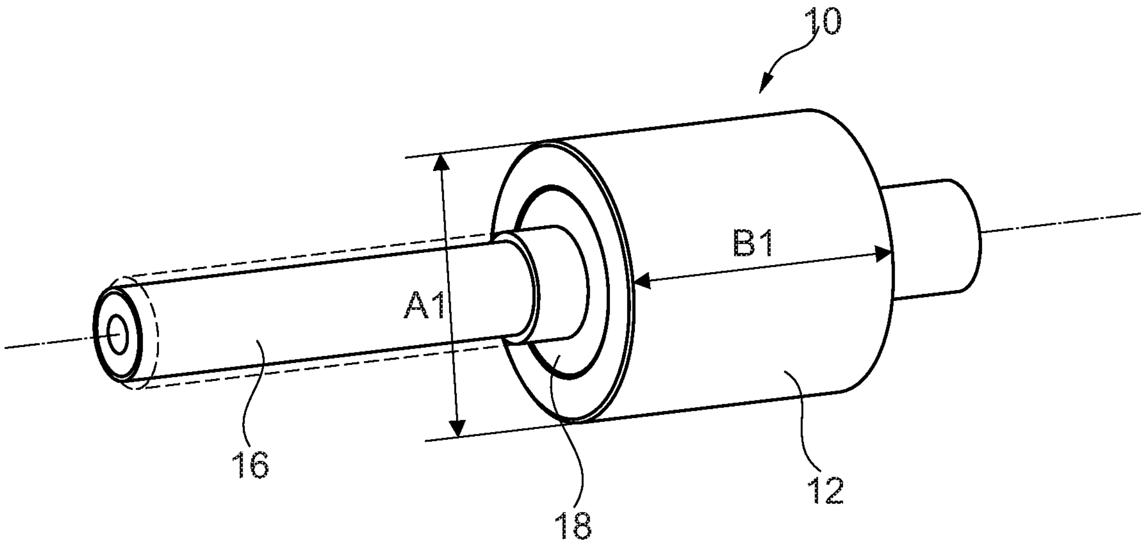
Figure 10:
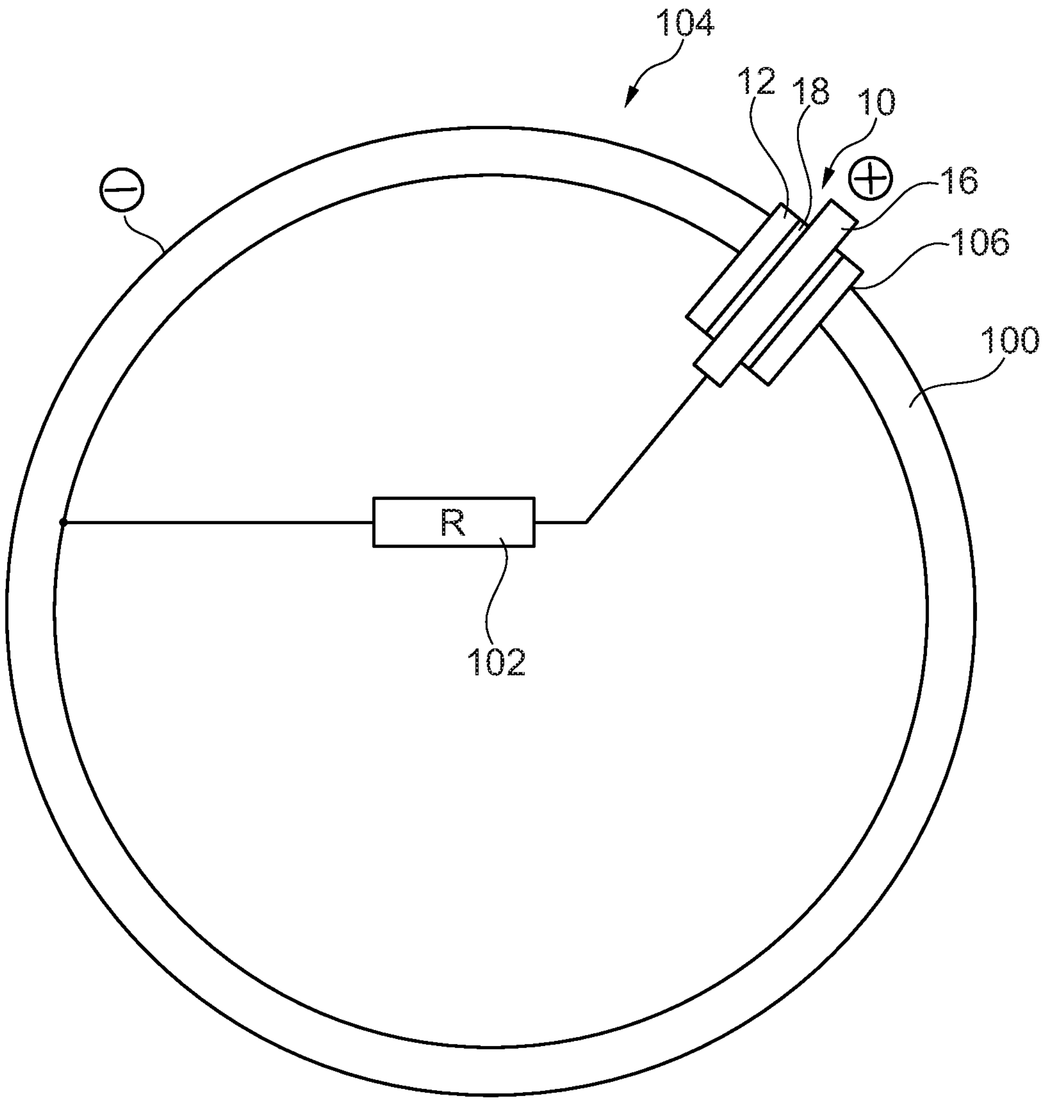
Figure 11:
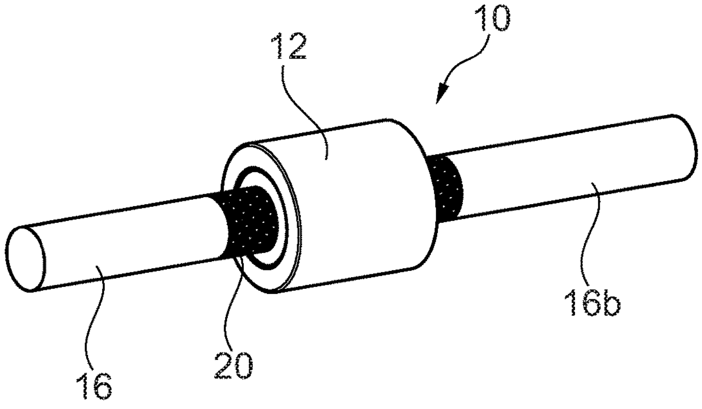
Figure 12:
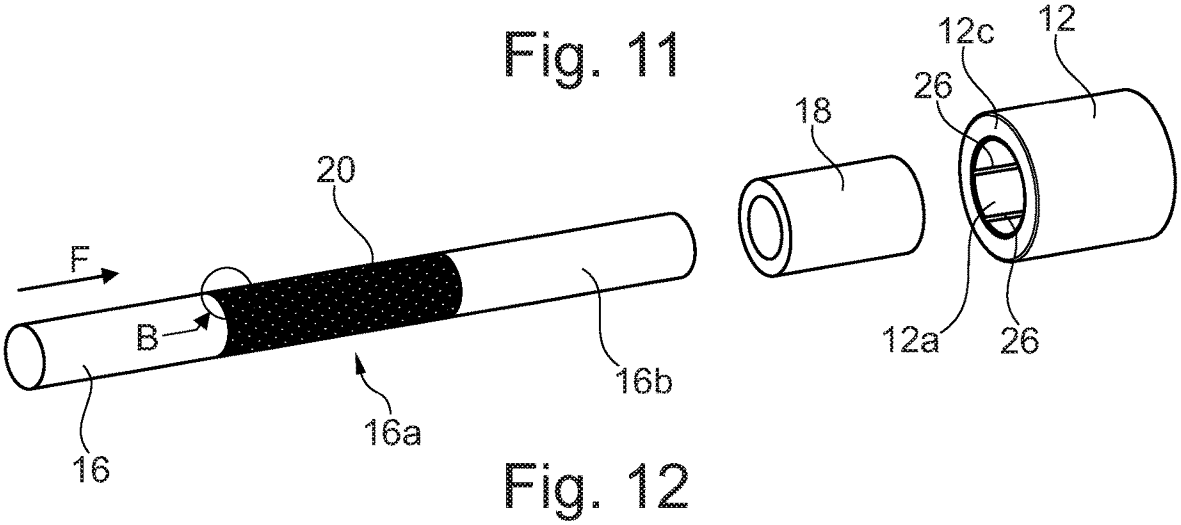
Figure 13:
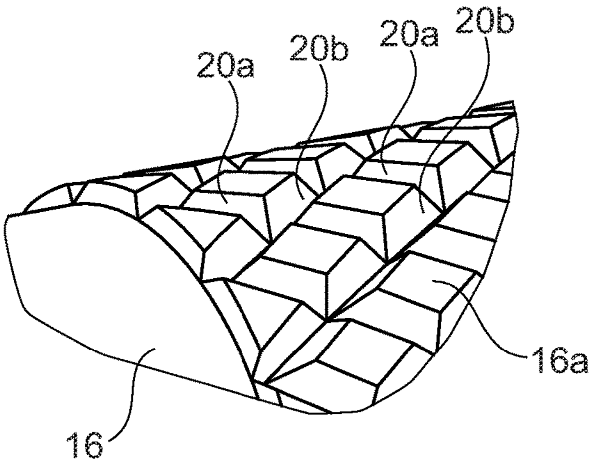
Figure 14:
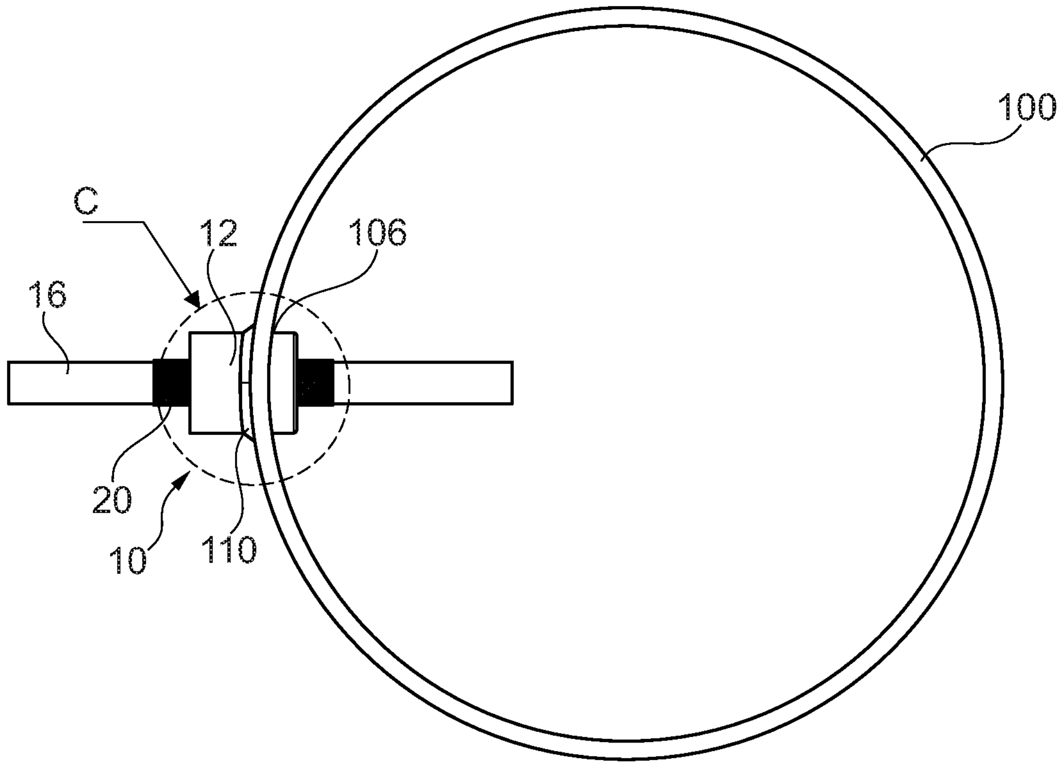
Figure 15:
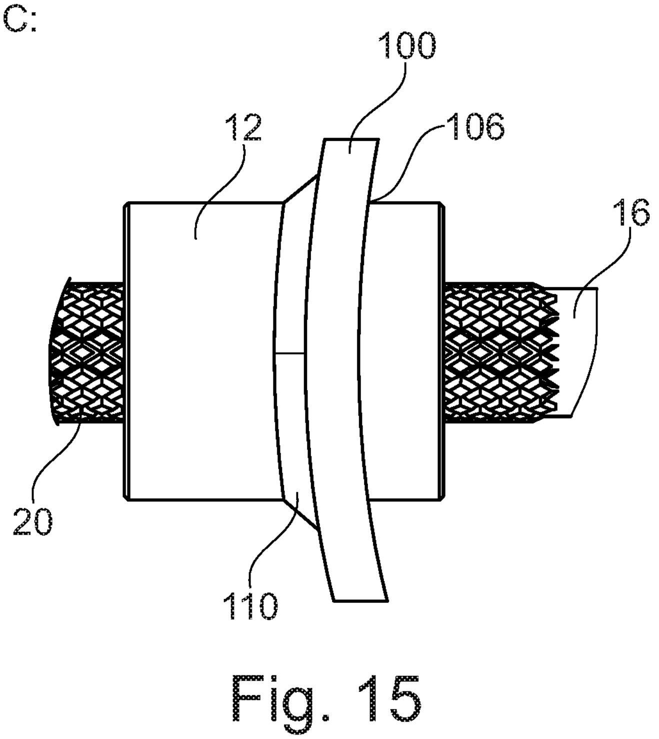
Figure 16:
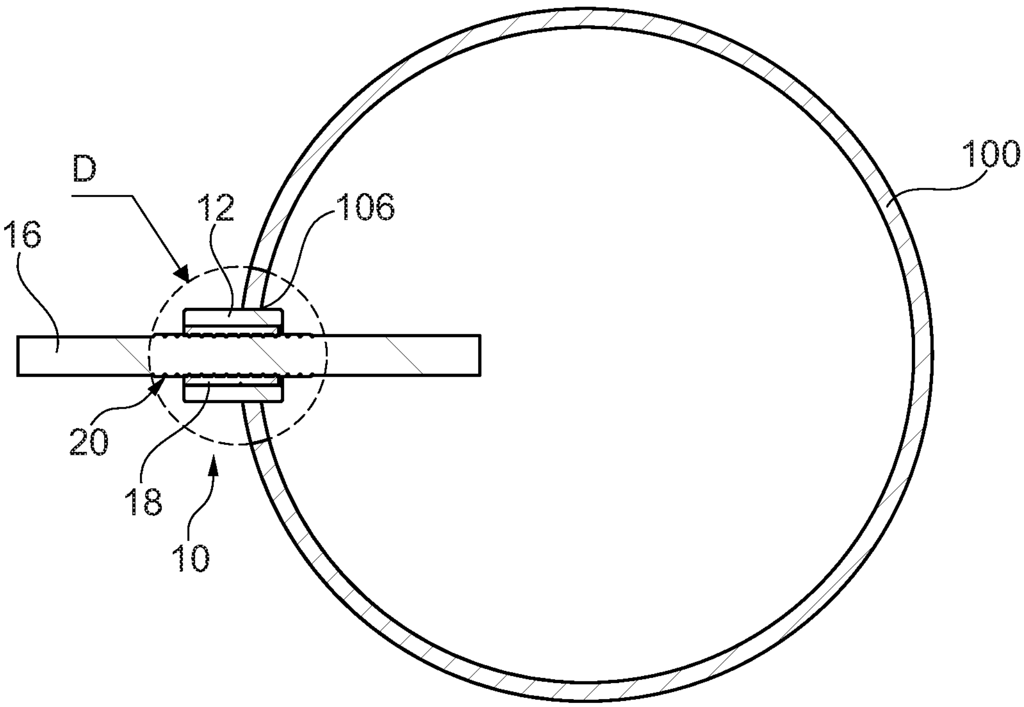
Figure 17:
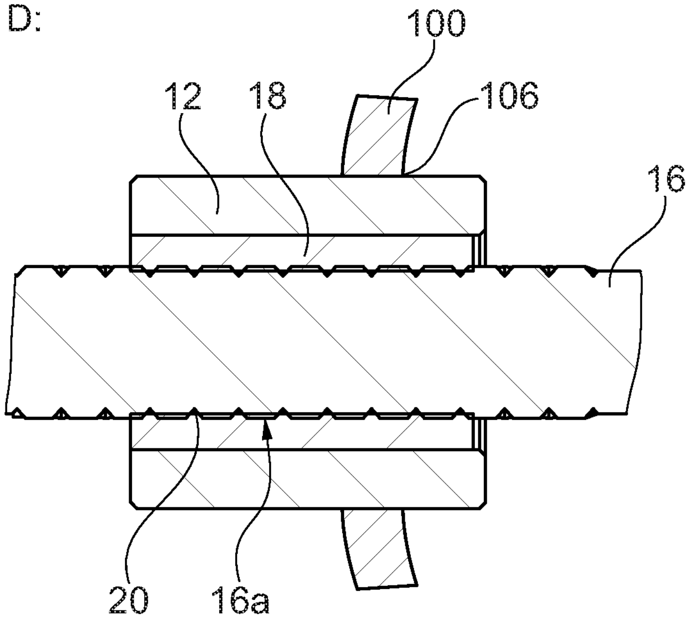

Further features and advantages of the present invention are described hereinafter with reference to the accompanying drawings. It is noted that each of the features shown in the drawings and described hereinafter may be important for the present invention on its own, even if not explicitly shown in the drawings or mentioned in the description. Furthermore, a combination of any of the features shown in the drawings and described hereinafter may be important for the present invention, even if that combination of features is not explicitly shown in the drawings or mentioned in the description. The drawings show:

FIG. 1 an example of the electrical connection according to a preferred embodiment of the present invention;

FIG. 2 the electrical connection of FIG. 1 in an exploded view;

FIG. 3 the electrical connection of FIG. 2 partially in a sectional view;

FIG. 4 a detail A of an electrical conductor of FIGS. 2 and 3;

FIG. 5 the electrical connection of FIG. 1 partially in a sectional view;

FIG. 6 the electrical connection of FIG. 1 before a mechanical cold transformation;

FIG. 7 the electrical connection of FIG. 1 after the mechanical cold transformation;

FIG. 8 a cross section through protrusions provided on an external circumferential surface of an electrical conductor;

FIG. 9 a cross section through grooves provided on an external circumferential surface of an electrical conductor;

FIG. 10 an example of use of an electrical connection according to the invention;

FIG. 11 an example of the electrical connection according to another preferred embodiment of the present invention;

FIG. 12 the electrical connection of FIG. 11 in an exploded view;

FIG. 13 a detail B of an electrical conductor of FIG. 12;

FIG. 14 another example of use of an electrical connection according to the invention;

FIG. 15 a detail C of the electrical connection of FIG. 14;

FIG. 16 yet another example of use of an electrical connection according to the invention; and FIG. 17 a detail D of the electrical connection of FIG. 16.

An electrical connection according to a preferred embodiment of the present invention is designated in its entirety with reference sign 10. The connection 10 comprises a bushing 12 having a geometric central axis 14. The bushing 12 has the form of a hollow cylinder. Further, the connection 10 comprises an electrical conductor 16 passing through said bushing 12 along the geometric central axis 14 and an insulating layer 18 electrically insulating said bushing 12 from said conductor 16. FIG. 1 shows a fully assembled and ready to use electrical connection 10. FIG. 2 shows an exploded view of the electrical connection 10.

The bushing 12, the insulating layer 18 and the electrical conductor 16 are preferably rotationally symmetric in respect to the geometric central axis 14. In particular, in a cross sectional view the bushing 12, the insulating layer 18 and the electrical conductor 16 all have a circular or a circular ring form.

As schematically shown in FIG. 10, the electrical connection 10 may be installed in a jacket or casing 100 of an exhaust-gas system of an internal combustion engine and electrically connected to an electrical component 102 disposed in the jacket 100. The embodiment of FIG. 10 shows a specific type of electrical connection 10. Further embodiments will be described in further detail hereinafter. The electrical component 102 is preferably an electrically heatable grid or honeycomb body of a catalytic converter 104 which is intended to be supplied with electric current through the electrical conductors 16 of electrical connections 10 after installation of the electrical component 102. In FIG. 10, the catalytic converter 104 or its jacket 100, respectively, is shown in a sectional view, in order to allow insight into the internal part of the jacket 100. When in use, the catalytic converter 104 or its jacket 100, respectively, will be closed in an airtight manner in order to prevent exhaust gases from escaping from the internal part of the jacket 100.

The electrical connection 10 is inserted into a mounting flange or opening 106 of the jacket 100, and the bushing 12 is fixed in the mounting flange or opening 106, e.g. by welding to the jacket 100. Alternatively, the bushing 12 could also be fixed in the mounting flange or opening 106 to the jacket 100 in any other way, e.g. by means of a threading or the like.

An internal (inside the jacket 100) end of the electrical conductor 16 of the electrical connection 10 is connected to the electrical component 102. An external end (outside the jacket 100) of the electrical conductor 16 opposite to the electrical component 102 may be connected to an electrical cable (not shown) or the like. Preferably, the electrical conductor 16 of the electrical connection 10 is provided with a positive electric charge (+). An end of the cable opposite to the electrical connection 10 may be connected to an electric power source (not shown), for example a battery or a control unit of a motor vehicle, preferably to the positive pole of the battery or the control unit.

Similarly, an internal end of the electrical conductor of another electrical connection (not shown) is connected to the electrical component 102. The connection may be achieved directly or indirectly via an internal casing of the electrical component 102. An external end of the electrical conductor of the other electrical connection opposite to the electrical component 102 may be connected to an electrical cable (not shown) or the like. Preferably, the electrical conductor 16 of the other electrical connection is provided with a negative electric charge (−), e.g. connected to a ground or earth terminal (e.g. a vehicle body or a vehicle chassis). An end of the cable opposite to the other electrical connection may be connected to an electric power source (not shown), for example a battery or a control unit of a motor vehicle, preferably to the negative pole of the battery or the control unit or to the ground or earth terminal. In the latter case, the negative pole of the battery would be connected to the ground or earth terminal at some other point.

Finally, the electrical conductor of a further electrical connection (not shown) merely fulfils the function of an electrically isolated holding pin adapted for holding an internal casing of the electrical component 102 or the electrical component 102 itself inside the jacket 100. To this end, it is suggested that an internal end of the electrical conductor of the further electrical connection is connected to the internal casing of the electrical component 102 or to the electrical component 102 itself. The connection is preferably electrically conductive and may be realized e.g. by welding, screwing, or in any other manner. The electrical conductor of the further electrical connection is electrically isolated in respect to the bushing by means of the insulating layer. Hence, the further electrical connection isolates the internal casing in respect to the jacket 100.

Of course, the electrical connections 10 according to the present invention are not limited to the different uses described here by way of example. The electrical connection 10 may be used in many other applications, too.

According to the present invention the bushing 12, the insulating layer 18 and the electric conductor 16 are pressed together in order to achieve a mechanical cold transformation. First, the bushing 12, the insulating layer 18 and the electric conductor 16 are arranged coaxially in respect to the geometric central axis 14 of the bushing 12 (see FIG. 6). To this end, before the mechanical cold transformation, an internal diameter of an internal circumferential surface 12*a* of the bushing 12 is slightly larger than an external diameter of the insulating layer 18. For example, the internal diameter of the bushing 12 may be larger by approximately 0.1 mm than the external diameter of the insulating layer 18, in order to be able to slip the bushing 12 over the insulating layer 18. Similarly, an external diameter of an external circumferential surface 16*b* of the electrical conductor 16 is slightly smaller than an internal diameter of the insulating layer 18, e.g. smaller by approximately 0.1 mm. After arranging the bushing 12, the insulating layer 18 and the electric conductor 16 coaxially in respect to the geometric central axis 14 of the bushing 12, these components 12, 18, 16 are pressed together in order to achieve a mechanical cold transformation (see FIG. 7).

The bushing 12, the insulating layer 18 and the electric conductor 16 are preferably pressed together during a rotary forging process thereby achieving the mechanical cold transformation. The pressure acts on the external circumferential surface of the bushing 12 of the electrical connection 10. The pressure is preferably directed in a radial direction inwards towards the geometric central axis 14. Due to the pressure and the mechanical cold transformation, the original dimensions (diameter A and length B) of the electrical connection 10 change (diameter A1 and length B1). In particular, the diameter will decrease and the length will increase (A1<A; B1>B), as could be depicted from FIGS. 6 and 7. Preferably, the change of dimensions refers to the bushing 12 and to the insulating layer 18, whereas the electrical conductor 16 will essentially maintain its original dimensions.

The pressure acting on the electrical connection 10 may also modify the structure of the materials used for the bushing 12, the insulating layer 18 and the electrical conductor 16. In particular, the material of the insulating layer 18 and/or the bushing 12 may be hardened and/or the flexural fatigue strength may be increased due to the pressure applied to the electrical connection 10.

Due to the mechanical cold transformation, the interconnection between the bushing 12 and the insulating layer 18 and between the insulating layer 18 and the electric conductor 16 is significantly increased. The electrical connection 10 can absorb much higher force and torque values without damage. In particular, the mechanical interconnection between the electric conductor 16 and the insulating layer 18 and/or between the insulating layer 18 and the bushing 12 does not loosen and break up, even if high force and torque values are applied to the electrical connection 10 during its intended use.

The electrical connection 10 and its components (bushing 12, insulating layer 18 and electrical conductor 16), respectively, could be dimensioned such and/or manufactured from special material that the electrical connector 10 can withstand up to 100 V DC and transmit up to 200 A. To this end, it is suggested that the diameter of the conductor 16 is between 5.0 mm and 8.0 mm, preferably between 6.0 mm and 7.5 mm. The external diameter A1 of the bushing 12 is dictated by the client and/or the intended use of the electrical connection 10.

In particular, the bushing 12 should neatly fit into the opening 106 in the jacket or casing 100. Typical examples for the external diameter A1 of the bushing 12 lie between 12.0 mm and 18.0 mm, preferably around 14.0 mm. In a cross section, the bushing 12 preferably has a thickness between the internal circumferential surface 12*a* and the external circumferential surface 12*b* (see FIG. 2) of between 1.0 mm to 5.0 mm, preferably of about 2.0 mm. The thickness of the insulating layer 18 depends of the given diameters of the electrical conductor 16 and of the bushing 12, as well as of the electrical or isolating properties to be achieved by the electrical connection 10. For example, the insulating layer 18 should achieve an insulation resistance of at least 10 MΩ at 500 V DC-voltage, preferably of up to a couple of GΩ under ambient environmental conditions. Depending on the material used for the insulating layer 18, it has a thickness of at least 1.2 mm, preferably around 1.6 mm. Of course, these are mere exemplary values, adapted in particular for the use shown in FIG. 10. When using the electrical connection 10 in other applications one or more of the physical, mechanical, electrical and thermal values and properties may vary even significantly.

It is suggested that the electrical conductor 16 has an external circumferential surface 16*b* with an arithmetic average roughness of at least Ra=1 μm (or higher) and/or protrusions and/or recesses 20 on at least part 16*a* of the external circumferential surface 16*b*, which is covered by the insulating layer 18 when assembled (see FIGS. 2 to 4). The roughness of the circumferential surface 16*b* is such that it provides protrusions (i.e. positive peaks) and/or recesses (i.e. negative peaks or troughs) 20 in an irregular distribution in respect to a mean surface extension. The desired roughness may be achieved during manufacturing, i.e. by machine turning, of the electrical conductor 16, e.g. by reducing the rotational speed with which the external circumferential surface 16*b* is machined, e.g. by means of a cutting or milling tool. In particular, if the rotational speed, with which the external circumferential surface 16*b* is machined is reduced, the roughness of the circumferential surface 16*b* of the electrical conductor 16 may increase. Alternatively, a desired roughness value could also be achieved by an additional process step after the manufacturing of the electrical conductor 16.

During the mechanical cold transformation, pressure acts in a radial direction onto the external circumferential surface 12*b* of the bushing 12. The bushing 12 transfers at least part of the radial pressure onto the insulating layer 18 which is pressed onto the external circumferential surface 16*b* of the electrical conductor 16. Some of the insulating material is pressed into the recesses 20 provided on the electrical conductor 16 and/or the protrusions 20 provided on the electrical conductor 16 are pressed into the insulating material of this insulating layer 18. Thus, an interlocking connection is established between the electrical conductor 16 and the insulating layer 18. This can further increase the force and torque values which the electrical conductor 10 can absorb without damage. In particular, the mechanical interconnection between the electric conductor 16 and the insulating layer 18 does not loosen and break up, even if high force and torque values are applied to the electrical connection 10.

As shown in FIG. 8, the protrusions 20 preferably have a cross section with a base 22*a* on the external circumferential surface 16*b* of the electrical conductor 16 and side walls 22*b* extending from the ends of the base 22*a* and preferably converging towards the top of the protrusion 20. Similarly, as shown in FIG. 9, the grooves 20 may have a cross section with an opening 24*a* on the external circumferential surface 16*b* and side walls 24*b* extending from the ends of the opening 24*a* and preferably converging towards the bottom of the groove 20.

A preferred cross section for the grooves 20 is a U-shape, so the material of the insulating layer 18 may enter and spread in the groove 20 more easily (see FIG. 9). Of course, the grooves 20 could also have any other cross section, e.g. a V-shaped cross section or a combination of a U- and a V-shape. In the case of a roughness on the external circumferential surface 16*b* of the electrical conductor 16, the grooves could have any irregular form and position and could differentiate from each other.

A preferred cross section for the protrusions 20 is a V-shape, so the protrusions 20 enter more easily into the material of the insulating layer 18 (see FIG. 8). Of course, the protrusions 20 could also have any other cross section, e.g. a U-shaped cross section or a combination of a V- and a U-shape. In the case of a roughness on the external circumferential surface 16*b* of the electrical conductor 16, the protrusions could have any irregular form and position and could differentiate from each other.

A preferred depth of the recesses 20 and a preferred height of the protrusions 20, respectively, may be between 0.05 mm and 0.3 mm, preferably about 0.15 mm, in respect to the rest of the external circumferential surface 16*b* of the electrical conductor 16. Of course, these are just exemplary values and may vary in practice considerably.

Further, it is suggested that the protrusions 20 and/or the recesses 20 provided on the external circumferential surface 16*b* of the electrical conductor 16 have a circumferential longitudinal extension and/or an axial longitudinal extension. For example, as shown in FIG. 4, the protrusions or the recesses 20*a* may have a longitudinal extension extending in an essentially circumferential direction, i.e. around the geometric central axis 14 of the bushing 12. Alternatively, the protrusions or the recesses 20*b* may have a longitudinal extension extending in an essentially axial direction, i.e. parallel to the geometric central axis 14 of the bushing 12. Further, it is possible that the protrusions and/or the grooves 20 have a longitudinal extension extending in a circumferential as well as in an axial direction. Hence, the protrusions and/or the grooves 20 extend in a slanted or helical (i.e. spiral) manner on the external circumferential surface 16*b* of the electrical conductor 16 (not shown). Such protrusions and/or grooves 20 may be achieved during manufacturing of the electrical conductor 16, e.g. by a certain feeding speed in respect to a rotational speed and a certain cutting depth of a cutting or milling tool with which the external circumferential surface 16*b* is machined. Alternatively, the protrusions and/or grooves 20 could also be achieved by an additional process step after the manufacturing of the electrical conductor 16. Of course, it is also possible that a first group of protrusions and/or grooves 20*a* has a longitudinal extension in a first direction and a second group of protrusions and/or grooves 20*b* has a longitudinal extension in a second direction and that the protrusions and/or the grooves 20*a* of the first group intersect with the protrusions and/or the grooves 20*b* of the second group (see FIG. 4).

It is preferred that the protrusions or recesses 20 are part of a ribbed external circumferential surface 16*a* of the electrical conductor 16 like the one shown in FIG. 4. The ribbed surface 16*a* preferably comprises a plurality of grooves 20*a*, 20*b*. The grooves 20*a* of a first group extend parallel to each other, preferably equidistant, and the grooves 20*b* of a second group extend parallel to each other, preferably equidistant. The grooves 20*a* of the first group runs in an angle in respect to the grooves 20*b* of the second group, the angle being larger than 0° and smaller than 180°. Preferably, the angle between the first and second grooves 20*a*, 20*b* is 90° resulting in a ribbed surface 16*a* with rectangles or squares between the grooves 20*a*, 20*b* (see FIG. 4). Alternatively, the angle may be between 10° and 80°, preferably around 60°, resulting in a ribbed surface 16*a* with rhombi between the grooves 20*a*, 20*b* (see FIG. 13). Of course, instead of or additionally to the grooves 20*a*, 20*b*, the ribbed surface 16*a* could also comprise protrusions.

In order to facilitate the material of the insulating layer 18 entering and spreading in the grooves 20 and/or to facilitate the protrusions 20 entering into the material of the insulating layer 18, when the external pressure is applied to the electrical connection 10 during the mechanical cold transformation, it is suggested that the insulating layer 18 is made of a material having a lower hardness than the material of which the electrical conductor 16 is made. Preferably, the material of the insulating layer 18 has a hardness on the Mohs scale of approximately 1.5 to 4.0, in particular of 2.0 to 3.0. For comparison, gold has a hardness on the Mohs scale of appr. 2.5 to 3.0, a copper coin of appr. 3.0 and steel of appr. 6.0 to 6.5. The material of the electrical conductor 16 has a larger hardness than the insulating material.

Further, it is suggested that the bushing 12 has an internal circumferential surface 12*a* with at least one of an arithmetic average roughness of at least Ra=1 μm (or higher), protrusions and recesses 26 on at least part of the internal circumferential surface 12*a*, which covers the insulating layer 18 when assembled. Hence, the bushing 12 may have the form of a hollow cylinder and the internal circumferential surface 12*a* of the bushing 12, where the insulating layer 18 is located, comprises the desired roughness, protrusions and/or recesses 26. The roughness of the circumferential surface 12*a* is such that it provides protrusions (i.e. positive peaks) and/or recesses (i.e. negative peaks or troughs) in an irregular distribution in respect to a mean surface extension. The desired roughness may be achieved during manufacturing, i.e. by machine turning, of the bushing 12, e.g. by reducing the rotational speed with which the internal circumferential surface 12*a* is machined, e.g. by means of a cutting or milling tool. In particular, if the rotational speed, with which the internal circumferential surface 12*a* is machined, is reduced, the roughness of the circumferential surface 12*a* may increase. Alternatively, a desired roughness value could also be achieved by an additional process step after the manufacturing of the bushing 12.

During the mechanical cold transformation pressure acts in a radial direction onto the external circumferential surface 12*b* of the bushing 12. The internal circumferential surface 12*a* of the bushing 12 is pressed in a radial direction onto the insulating layer 18. Some of the insulating material of the insulating layer 18 is pressed into the recesses 26 provided on the internal circumferential surface 12*a* of the bushing 12 and/or the protrusions 26 provided on the internal circumferential surface 12*a* of the bushing 12 are pressed into the insulating material of the insulating layer 18. Thus, an interlocking connection is established between the bushing 12 and the insulating layer 18. This can further increase the force and torque values which the electrical conductor 10 can absorb without damage. In particular, the mechanical interconnection between the bushing 12 and the insulating layer 18 does not loosen and break up, even if high force and torque values are applied to the electrical connection 10.

Preferably, similar to what is shown in FIGS. 8 and 9 and described above regarding the protrusions and grooves 20 of the electrical conductor 16, the protrusions 26 of the internal circumferential surface 12*a* of the bushing 12 have a cross section with a base on the internal circumferential surface 12*a* of the bushing 12 and side walls extending from the ends of the base and preferably converging towards the top of the protrusions 26. Similarly, the grooves 26 may have a cross section with an opening on the internal circumferential surface 12*a* and side walls extending from the ends of the opening and preferably converging towards the bottom of the groove.

A preferred cross section for the grooves 26 is a U-shape, so the material of the insulating layer 18 may enter and spread in the grooves 26 more easily. Of course, the grooves 26 could also have any other cross section, e.g. a V-shaped cross section or a combination of a U- and a V-shape. In the case of a roughness on the internal circumferential surface 12*a* of the bushing 12, the grooves could have any irregular form and position and could differentiate from each other.

A preferred cross section for the protrusions 26 is a V-shape, so the protrusions 26 may enter more easily into the material of the insulating layer 18. Of course, the protrusions 26 could also have any other cross section, e.g. a U-shaped cross section or a combination of a V- and a U-shape. In the case of a roughness on the internal circumferential surface 12*a* of the bushing 12, the protrusions could have any irregular form and position and could differentiate from each other.

A preferred depth of the recesses 26 and a preferred height of the protrusions 26, respectively, may be between 0.05 mm and 0.3 mm, preferably about 0.15 mm, in respect to the rest of the internal circumferential surface 12*a* of the bushing 12. Of course, these are just exemplary values and may vary in practice considerably.

Further, it is suggested that the protrusions and/or the recesses 26 provided on the internal circumferential surface 12*a* of the bushing 12 have at least one of a circumferential extension and an axial extension. For example, the protrusions or the recesses 26 may have a longitudinal extension running in an essentially circumferential direction (not shown), i.e. around the geometric central axis 14 of the bushing 12. Alternatively, the protrusions or the recesses 26 may have a longitudinal extension running in an essentially axial direction (see FIGS. 2, 3, 5 and 12), i.e. parallel to the geometric central axis 14 of the bushing 12. Further, it is possible that the protrusions and/or the grooves 26 have a longitudinal extension running in a circumferential as well as in an axial direction. Hence, the protrusions and/or the grooves 26 extend in a slanted or helical (i.e. spiral) manner on the internal circumferential surface 12*a* of the bushing 12 (not shown). Such protrusions and/or grooves 26 may be achieved during manufacturing of the bushing 12, e.g. by a certain feeding speed in respect to a rotational speed and a certain cutting depth of a cutting or milling tool with which the internal circumferential surface 12*a* is machined. Alternatively, the protrusions and/or grooves 26 could also be achieved by an additional process step after the manufacturing of the bushing 12. Of course, it is also possible that a first group of protrusions and/or grooves 26 has a longitudinal extension in a first direction and a second group of protrusions and/or grooves 26 has a longitudinal extension in a second direction and that the protrusions and/or the grooves 26 of the first group intersect with the protrusions and/or the grooves 26 of the second group.

According to a preferred embodiment shown in FIGS. 2, 3, 5 and 12, the bushing 12 has recesses in the form of axial grooves 26 provided on the internal circumferential surface 12*a* of the bushing 12 and spaced apart from each other in a circumferential direction. The grooves 26 have a longitudinal extension extending in an axial direction, i.e. parallel to the geometric central axis 14 of the bushing 12. Preferably, the grooves 26 are equally spaced apart from each other in the circumferential direction, i.e. each separated from neighbouring grooves by a given angle. If the angle is 60°, there are six grooves 26 equally spaced to each other on the internal circumferential surface 12*a* of the bushing 12. Of course, a different number of grooves 26 and different angles between the grooves 26, equally spaced apart from each other or not, could be provided, too.

Preferably, the axial grooves 26 do not extend along the entire axial extension of the internal circumferential surface 12*a* of the bushing 12. Rather, it is suggested that the grooves 26 extend only along a part of the internal surface 12*a* of the bushing 12, starting at one end surface 12*c* of the bushing 12 and ending in a distance to an opposite end surface 12*d* of the bushing 12. This can be seen in FIGS. 3 and 5. Hence, the grooves 26 do not reach the opposite end surface 12*d* of the bushing 12. This can further increase the force and torque values which the electrical connection 10 can absorb without damage. In particular, a force F (see FIGS. 3 and 12) acting on the electrical conductor 16 in a direction towards the opposite end surface 12*d* of the bushing 12 will prevent the electrical conductor 16 from being pressed or pulled out of the bushing 12 together with the insulating layer 18. The force F is also called an electrode displacement force. The electrode displacement force F is preferably above 5,000 N, in particular 5,500 N to 10,000 N.

FIGS. 11 to 13 show another preferred embodiment of the electrical connection 10 according to the present invention. In particular, in this embodiment, the grooves 20*a* of the first group run in an angle in respect to the grooves 20*b* of the second group, the angle between 10° and 80°, preferably around 60°, resulting in a ribbed surface 16*a* with rhombi between the grooves 20*a*, 20*b* (see FIG. 13). Of course, instead of or additionally to the grooves 20*a*, 20*b*, the ribbed surface 16*a* could also comprise protrusions.

Of course, the external circumferential ribbed surface 16*a* may have any other design, too, provided that it permits a mechanical form fit interaction between the insulating layer 18 and the electrical conductor 16, thereby achieving an interlocking connection between the two and enhancing the fixation of the insulating material 18 on the external circumferential surface 16*b* of the electrical conductor 16.

It can be seen in FIG. 11 that the ribbed surface 16*a* has a larger axial extension than the insulating layer 18 and the bushing 12. This allows an exact position of the electrical conductor 16 in respect to the bushing 12 during the manufacturing process before the bushing 12, the insulating layer 18 and the electric conductor 16 are pressed together in order to achieve the mechanical cold transformation.

FIGS. 14 and 15 show the electrical connection 10 of FIGS. 11 to 13 fixed in an opening 106 of a jacket or casing 100, for example of an exhaust-gas system of an internal combustion engine. The electrical connection 10 may be fixed in the opening 106 by welding, screwing or similar connection techniques. In the FIGS. 14 and 15 a welding bead 110 is visible. Alternatively or additionally, the electrical connection 10 could also be provided with a radially protruding collar (not shown) which rests on an outside surface of the jacket 100 when the electrical connection 10 is introduced into the opening 106. The collar may additionally support an airtight fixation of the electrical connection 10 in the opening 106 of the jacket 100.

FIGS. 16 and 17 show another embodiment of an electrical connection 10 fixed in an opening 106 of a jacket or casing 100, for example of an exhaust-gas system of an internal combustion engine. The ribbed external circumferential surface 16*a* may comprise grooves 20 which extend around the entire or part of the circumference of the external surface 16*b* of the electrical conductor 16. The grooves 20 may have an annular or a helical form. The electrical connection 10 may be fixed in the opening 106 by welding, screwing or similar connection techniques. In the FIGS. 16 and 17 the electrical connection is fixed into the opening by screwing. To this end, the external surface 12*b* of the bushing 12 or at least part of it is provided with an external thread. A corresponding internal thread may be provided in the opening 106.

Alternatively or additionally, the electrical connection 10 could also be provided with a radially protruding collar (not shown) which rests on an outside surface of the jacket 100 when the electrical connection 10 is introduced into the opening 106. The collar may additionally support an airtight fixation of the electrical connection 10 in the opening 106 of the jacket 100.

In order to facilitate the material of the insulating layer 18 entering and spreading in the grooves 26 and/or the protrusions 26 entering into the material of the insulating layer 18, it is suggested that the insulating layer 18 is made of a material having a lower hardness than the material of which the bushing 12 is made. Preferably, the material of the insulating layer 18 has a hardness on the Mohs scale of approximately 1.5 to 4.0, in particular of 2.0 to 3.0. The material of the bushing 12 has a larger hardness than the insulating material.

It is suggested that the bushing 12 and/or the electrical conductor 16 is made of a stainless steel, in particular of a nickel-chromium-iron alloy. The material of the bushing 12 and/or the electrical conductor 16 may comprise a minimum of 70% nickel (plus cobalt), 10-20% chromium, and 3-15% iron. Besides these components, the material can further comprise small amounts (<2%) of carbon, manganese, sulphur, silicon and/or copper. Preferably, the material of the bushing 12 and/or the electrical conductor 16 comprises a minimum of 72% nickel (plus cobalt), 14-17% chromium and 6-10% iron. It may be advantageous if both the bushing 12 and the electrical conductor 16 are made of the same material. In principle, all materials may be used for the bushing 12 and the electrical conductor 16 which are adapted for providing the necessary physical, mechanical, electrical and thermal properties required for the electrical connection 10.

It is further suggested that the insulating layer 18 is made of a material comprising at least 50% of a phyllosilicate mineral. Preferably, the insulating material comprises more than 70%, in particular around 90% of a phyllosilicate mineral. The rest of the material of the insulating layer 18 may be a laminate or bonding material. Preferably, the material of the insulting layer 18 is less hygroscopic than magnesium oxide (MgO). In principle, all materials may be used for the insulating layer 18 which are adapted for providing the necessary physical, mechanical, electrical and thermal properties required for the electrical connection 10. In particular, the material should be elastic enough to compensate for the thermal expansion of the different materials used in the electrical connection 10 due to the large range of thermal variation (more than 1,000° K) during the intended use of the electrical connection 10, without breaking or cracking. Hence, a high degree and long lasting air tightness of the electrical connection 10 can be guaranteed.

Summing up, the present invention has in particular the following advantages:

When the bushing 12 is welded to a jacket or casing 100, the insulating layer 18 will not break or crack due to the different thermal shrinkage values of the material of the bushing 12 and the material of the insulating layer 18. A high level of electrical insulation characteristics and air-tightness of the electrical connection 10 is achieved. The insulation resistance is more than 10 MΩ at a voltage of 500 V DC, and can even reach values of up to a couple of GΩ.

During use of the electrical connection 10 the temperature may vary between ambient temperature (as far down as −40° C.) when the combustion engine and the catalytic converter 104 have been turned off and cooled down and as far up as around+1,000° C. when the combustion engine and the catalytic converter 104 are in operation (resulting in a temperature change of above 1,000° K). The electrical connection 10 can resist these large temperature fluctuations without negatively affecting the physical, mechanical, electrical and thermal characteristics and properties of the electrical connection 10.

The electrical connection 10 is able to cope with very high force and torque values applied thereto. In particular, the mechanical interconnection between the electric conductor 16 and the insulating layer 18 and/or between the insulating layer 18 and the bushing 12 will not loosen and break up due to large force and/or torque values acting on the electrical connection 10. The electrical connection 10 can withstand a breaking torque of above 15 Nm, preferably above 16 Nm, particularly preferred above 17 Nm, in particular around 20 Nm.

The sealing effect of the electrical connection 10 is particularly high due to the improved mechanical interconnection of the insulating layer 18 towards the electrical conductor 16 and/or the bushing 12. A small amount of leakage of gas or fluid (e.g. exhaust gas) from the inside of the jacket or casing 100 to the environment across the electrical connection 10 is allowed. The invention significantly reduces the amount of leakage. The electrical connection 10 achieves a leakage value of less than 20 ml/min at a pressure of 0.3 bar.

The invention claimed is:

1. A process of manufacturing an electrical connection, the electrical connection including a bushing having a cylindrical cross-section with an external circumferential surface having an outer diameter and a geometric central axis, an electrical conductor passing through the bushing along the geometric central axis, and an insulating layer electrically insulating the bushing from the electrical conductor, the process comprising steps of:

providing at least a part of the external circumferential surface of the electrical conductor with protrusions and recesses having an arithmetic average roughness of at least Ra=1 μm;

arranging the insulating layer concentrically within the bushing, and arranging the electrical conductor concentrically within the insulating layer thereby covering the protrusions and recesses of the external circumferential surface of the electrical conductor with the insulating layer; and pressing the bushing, the insulating layer and the electrical conductor together radially during a rotary forging process to mechanically join the bushing, the insulating layer and the electrical conductor by cold transformation of the bushing and the insulating layer, wherein during the rotary forging process radial pressure acts in a radial direction onto the external circumferential surface of the bushing thereby decreasing the outer diameter of the bushing and transferring at least part of the radial pressure to the insulating layer causing the insulating layer to flow into the recesses to mechanically join the insulating layer and the electrical conductor.

2. The process of claim 1, wherein:

at least one of the protrusions and recesses have at least one of a circumferential extension and an axial extension.

3. The process of claim 1, wherein:

the protrusions and recesses are part of a ribbed external circumferential surface of the electrical conductor with a plurality of grooves.

4. The process of claim 1, further comprising:

prior to the arranging step, providing at least a part of an internal circumferential surface of the bushing with an arithmetic average roughness of at least Ra=1 μm; and in the arranging step covering the insulating layer with the part of the internal surface of the bushing.

5. The process of claim 4, further comprising:

prior to the arranging step, providing the part of the internal circumferential surface of the bushing with protrusions and recesses.

6. The process of claim 5, wherein:

at least one of the protrusions and recesses have at least one of a circumferential extension and an axial extension.

7. The process of claim 5, wherein:

the recesses are in the form of axial grooves spaced apart from each other in a circumferential direction.

8. The process of claim 7, wherein:

the axial grooves extend from one end surface of the bushing to an opposite end surface of the bushing.

9. The process of claim 5, wherein:

the pressing step causes the insulating layer to flow into the recesses to mechanically join the insulating layer and the bushing.

10. The process of claim 1, wherein:

the insulating layer is made of a material having a lower hardness than a material of which the electrical conductor is made.

11. The process of claim 1, wherein:

at least one of the bushing and the electrical conductor is made of stainless steel.

12. The process of claim 11, wherein:

the stainless steel is a nickel-chromium-iron alloy.

13. The process of claim 1, wherein:

the insulating layer is made of a material comprising at least 50% of a phyllosilicate material.

14. The process of claim 1, further comprising:

introducing the electrical conductor of the electrical connection into a jacket of an exhaust-gas system through an opening of the jacket;

fixedly attaching the electrical conductor to the jacket; and electrically connecting the electrical conductor to an electrical component located inside the jacket.

15. The process of claim 14, wherein:

the electrical component is an electrically heatable grid or honeycomb body of a catalytic converter.

* * * * *